Patented Dec. 7, 1926.

1,609,617

UNITED STATES PATENT OFFICE.

WILLIAM O. FROHRING, OF CLEVELAND, OHIO.

METHOD OF INCREASING THE COAGULATING POINT OF MILK.

No Drawing.  Application filed June 15, 1926.  Serial No. 116,087.

My invention relates to improvement in the method of increasing the coagulating point of milk products.

The coagulating point of milk and milk products varies according to numerous factors such as age, acidity, salt content, etc. Under ordinary circumstances when milk is used that is of average good quality, no difficulty is experienced in sterilizing, such as evaporated milk at a temperature and holding time which are considered safe as far as the future keeping qualities of the milk are concerned.

There are times in the manufacture of evaporated milk and similar products when it will not take the minimum temperature necessary to make it keep. In cases of this kind it is customary to use some agent to increase the coagulating point. The following, when added, largely increase the coagulating point:—Tri-sodium phosphate, sodium ammonium, acid phosphate, ammonium phosphate and sodium bicarbonate. Of these sodium bicarbonate is the best product to use and is the most widely used.

However, in the production of such products as infant foods which are sterilized in the usual way, it is sometimes necessary to use as regular ingredients, substances which have a marked tendency to reduce the coagulating point. The value of the food elements so contained make it highly desirable to devise means of increasing the coagulating point more effectively than by any of the present methods and at the same time not alter the composition of the salts, and therefore detract from its value.

It is also recognized that certain colloids exert a protective effect on other colloids in preventing coagulation. Such are termed "protective colloids" and the one most commonly mentioned is gelatin. None of the colloids commonly known to have a protective effect were of any value at the high temperature used in sterilizing.

I have found that caseinates such as sodium, calcium and potassium caseinates have a very powerful protective effect in increasing the coagulating point of milk and milk products.

This may be accomplished by adding to the mixture already made or the same composition can be maintained by substituting a caseinate for a part of the protein already present. It has a further advantage since this is a desirable ingredient and such combinations of sodium caseinate, calcium caseinate and postassium caseinate so as not to disturb the proper salt balance.

Having described my invention, what I desire to secure by Letters Patent is:

1. The method of increasing the coagulating point of milk which consists of the addition of caseinates.

2. The method of increasing the coagulating point of milk which consists of substituting caseinates for part of the protein content.

3. The method of increasing the coagulating point of milk which consists of removing a portion of the protein content therefrom and substituting therefor caseinates in about the same proportion of the removed protein content.

In testimony whereof I affix my signature.

WILLIAM O. FROHRING.